(12) United States Patent
Cetin et al.

(10) Patent No.: US 8,229,786 B2
(45) Date of Patent: Jul. 24, 2012

(54) CLICK PROBABILITY WITH MISSING FEATURES IN SPONSORED SEARCH

(75) Inventors: Ozgur Cetin, New York, NY (US);
Kannan Achan, Mountain View, CA (US); Erick Cantu-Paz, Sunnyvale, CA (US); Rukmini Iyer, Los Altos, CA (US)

(73) Assignee: Yahoo! Inc., Sunnyvale, CA (US)

( * ) Notice: Subject to any disclaimer, the term of this patent is extended or adjusted under 35 U.S.C. 154(b) by 197 days.

(21) Appl. No.: 12/755,226

(22) Filed: Apr. 6, 2010

(65) Prior Publication Data
US 2011/0246286 A1  Oct. 6, 2011

(51) Int. Cl.
*G06Q 30/00* (2012.01)
(52) U.S. Cl. ........................................... 705/14.1
(58) Field of Classification Search .................. 705/14.1
See application file for complete search history.

(56) References Cited

U.S. PATENT DOCUMENTS
2007/0067215 A1* 3/2007 Agarwal et al. ................ 705/14

OTHER PUBLICATIONS

A. Dempster, N. Laird, and D. Rubin, *Maximum Likelihood from Incomplete Data via the EM Algorithm*, Journal of the Royal Statistical Society, Series B, 39:1-38, 1977.

* cited by examiner

*Primary Examiner* — Daniel Lastra
(74) *Attorney, Agent, or Firm* — Brinks Hofer Gilson & Lione

(57) ABSTRACT

Sponsored search advertising utilizes a click probability as one factor in selecting and ranking advertisements that are displayed with search results. The probability of click may also be referred to as a predicted click-through rate ("CTR") that may be multiplied by an advertiser's bid for a particular advertisement to rank the display of advertisements. An accurate prediction of the click probability improves the potential revenue that is generated by advertisements in a pay per click system. Other advertising systems may benefit from an accurate and reliable estimate for an advertisement's probability of click in different environments and scenarios.

24 Claims, 4 Drawing Sheets

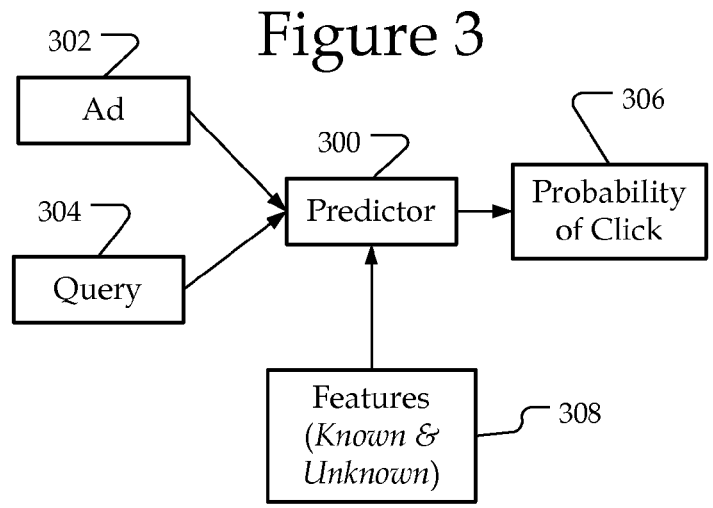
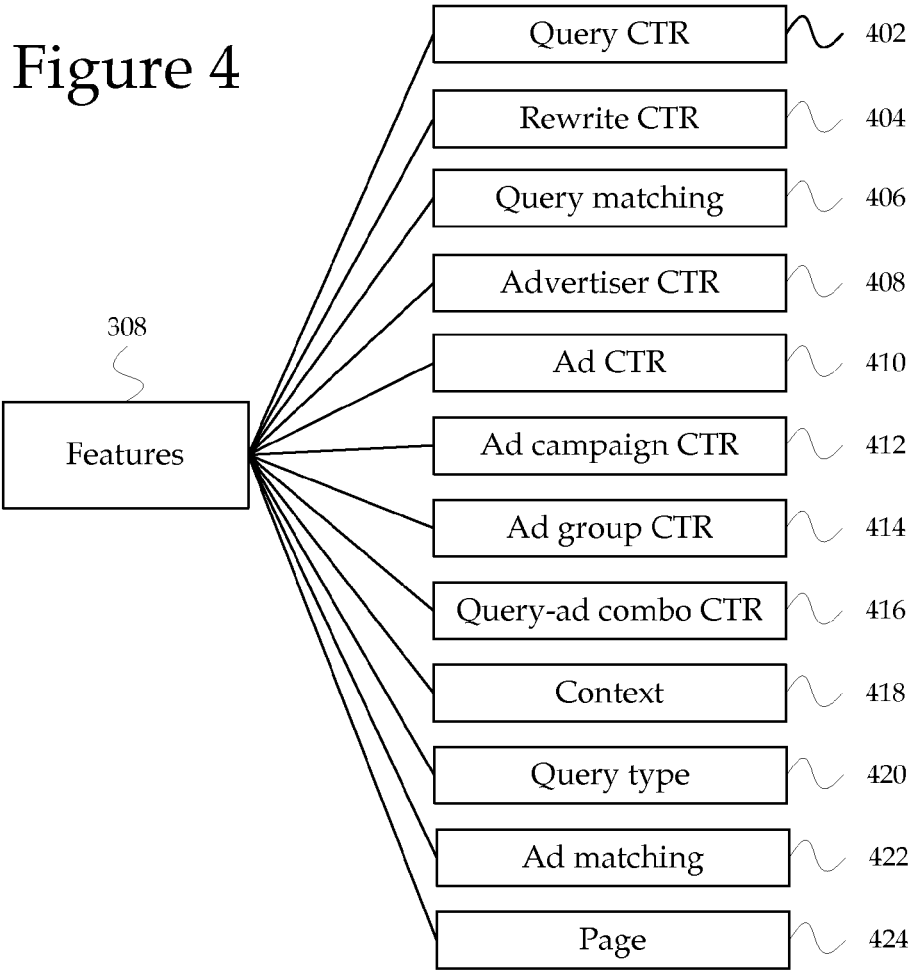

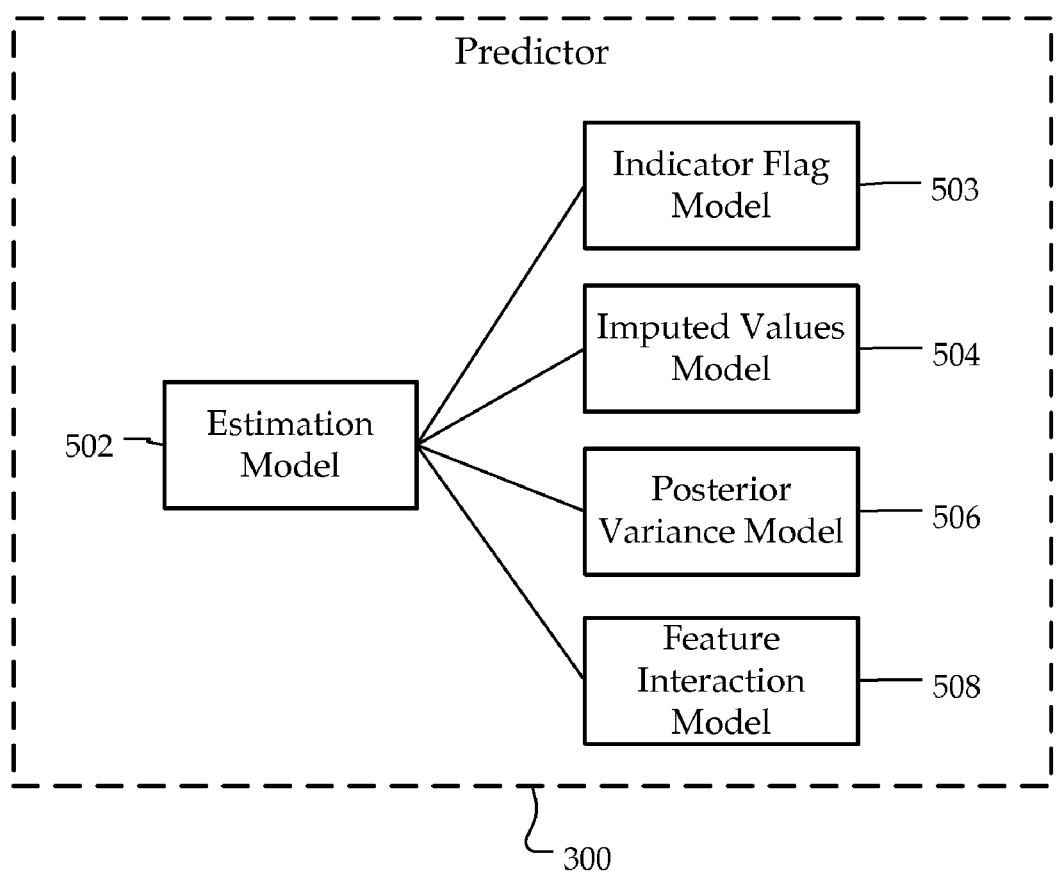

CLICK PROBABILITY WITH MISSING FEATURES IN SPONSORED SEARCH

BACKGROUND

Online advertising may be an important source of revenue for enterprises engaged in electronic commerce. Processes associated with technologies such as Hypertext Markup Language (HTML) and Hypertext Transfer Protocol (HTTP) enable a web page to be configured to display advertisements. Advertisements may commonly be found on many web sites. For example, advertisements may be displayed on search web sites and may be targeted to individuals based upon search terms provided by the individuals.

One metric for measuring the success of advertisements is the click-through rate ("CTR"). The CTR may be used for measuring an advertisement's past success or for predicting an advertisement's future success. For sponsored searching, the displayed advertisements may be ranked based on a bid amount and a predicted future success, such as a click probability or an estimated CTR. In order to optimize the display of advertisements and to maximize revenue from that advertisement, the probability of click should be an accurate estimate.

BRIEF DESCRIPTION OF THE DRAWINGS

The system and method may be better understood with reference to the following drawings and description. Non-limiting and non-exhaustive embodiments are described with reference to the following drawings. The components in the drawings are not necessarily to scale, emphasis instead being placed upon illustrating the principles of the invention. In the drawings, like referenced numerals designate corresponding parts throughout the different views.

FIG. 3 is a diagram of exemplary prediction;

FIG. 4 is a diagram of exemplary features for prediction;

FIG. 5 is a diagram of an exemplary predictor; and

DETAILED DESCRIPTION

By way of introduction, a sponsored search advertising system may be improved by accurately predicting the probability of a click for an advertisement. The probability of click may also be referred to as a predicted click-through rate ("CTR") that may be multiplied by an advertiser's bid for a particular advertisement to rank the display of advertisements. Other advertising systems may benefit from an accurate and reliable estimate for an advertisement's probability of click in different environments.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims. Nothing in this section should be taken as a limitation on those claims. Further aspects and advantages are discussed below.

Figure 1:
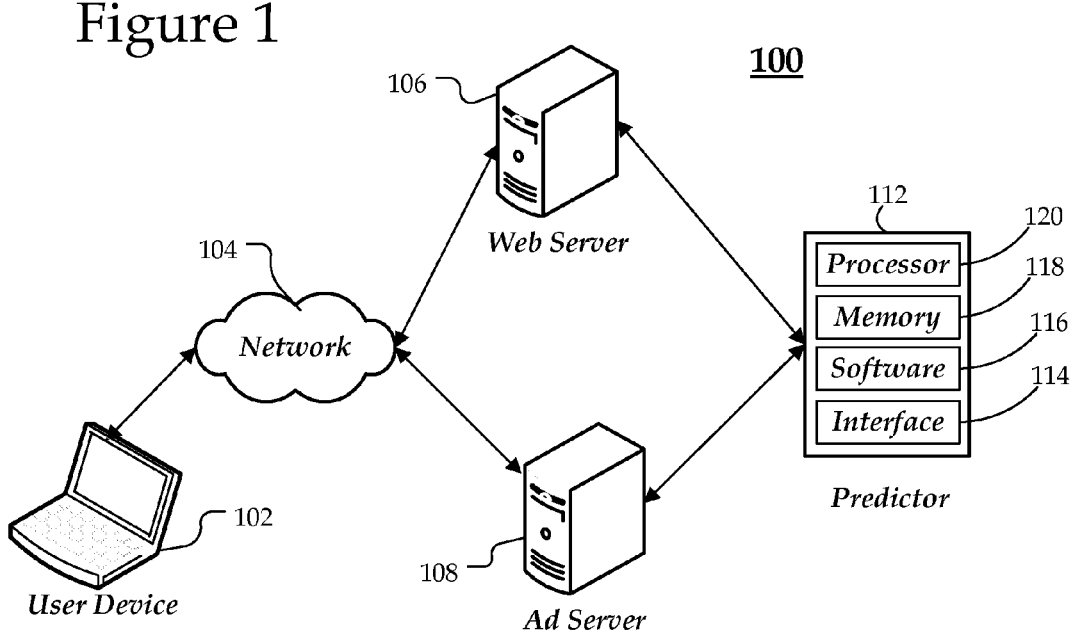
FIG. 1 is a diagram of an exemplary network system.

FIG. 1 depicts a block diagram illustrating one embodiment of an exemplary network system 100. The network system 100 may provide a platform for the prediction of a CTR. In the network system 100, a user device 102 is coupled with a web server 106 and an advertisement ("ad") server 108 through a network 104. As described below, the web server 106 may include or be coupled with a search engine that provides search results. A predictor 112 may be coupled with the web server 106 and the ad server 108. Herein, the phrase "coupled with" is defined to mean directly connected to or indirectly connected through one or more intermediate components. Such intermediate components may include both hardware and software based components. Variations in the arrangement and type of the components may be made without departing from the spirit or scope of the claims as set forth herein. Additional, different or fewer components may be provided.

The user device 102 may be a computing device which allows a user to connect to a network 104, such as the Internet. Examples of a user device include, but are not limited to, a personal computer, personal digital assistant ("PDA"), cellular phone, or other electronic device. The user device 102 may be configured to allow a user to interact with the web server 106, the ad server 108, or other components of the network system 100. The user device 102 may include a keyboard, keypad or a cursor control device, such as a mouse, or a joystick, touch screen display, remote control or any other device operative to allow a user to interact with the web server 106 via the user device 102. The user device 102 may be configured to access other data/information in addition to web pages over the network 104 using a web browser, such as INTERNET EXPLORER® (sold by Microsoft Corp., Redmond, Wash.) or FIREFOX® (provided by Mozilla). The data displayed by the browser may include advertisements. In an alternative embodiment, software programs other than web browsers may also display advertisements received over the network 104 or from a different source.

The web server 106 may act as an interface through the network 104 for providing a web page to the user device 102. In one embodiment, the web server 106 comprises a search engine, and the web page that is provided to the user device 102 may be a search results page that is provided in response to receiving a search query from the user device 102. In alternative embodiments, there may be a search engine that is separate from the web server 106. The web server 106 may provide the user device 102 with any pages that include advertisements and that are requested by a user of the user device 102. In one example, the web server 106 may receive requests from the user device 102 and route data from the search engine and/or the ad server 108 for display back on the user device 102.

The ad server 108 may provide advertisements with or as a part of the pages provided to the user device 102. The ad server 108 may provide advertisements to the web server 106 for the page being provided to the user device 102. The advertisements that are displayed may be based on bids from advertisers for particular search keywords/queries and based on an estimated CTR for the advertisement. In other words, the web server 106 and the ad server 108 provide sponsored search results. In alternative embodiments, the web server 106 may provides pages other than search results pages that also include advertisements provided by the ad server 108. Those advertisements may be displayed based at least in part on a predicted CTR. The predicted CTR of an advertisement may determine which ads are shown and where those ads are shown. The displayed pages may include advertising space or advertisement slots that are filled with advertisements viewed with the page on the user device 102.

In one embodiment, the ad server 108 may include or be coupled with an advertiser ("ad") database that stores advertisements and relevant information for the display of those advertisements. Advertisements, such as images, video, audio, text, banners, flash, animation, or other formats may be stored in the ad database. The ad database may also include records regarding the advertisements that are shown and the resulting impressions, clicks, CTR, and/or actions taken for those advertisements. In one example, the stored data includes at least the exemplary features 308 in FIG. 4. The data related to advertisement impressions, clicks and resulting actions may be stored in either the search engine/web server database and/or an advertiser database. The advertisement ("ad") data may be used by the predictor 112 for estimating a click probability for the ad.

Figure 2:
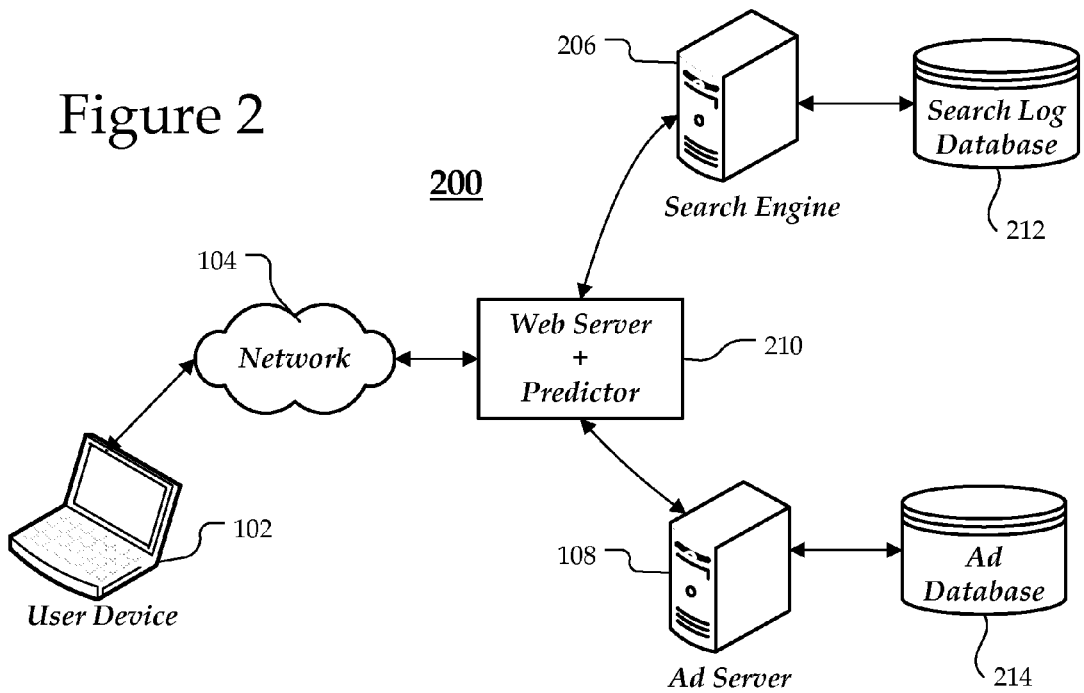
FIG. 2 is a diagram of an alternative exemplary network system.

The predictor 112 may be used by the web server 106 and/or the ad server 108 for calculating click probability which may be used in the selection and placement of advertisements on a page. The predictor 112 may be a part of the web server 106 and/or a part of the ad server 108. An alternative embodiment is shown in FIG. 2 in which the predictor 112 is part of the web server 106. In FIG. 1, the predictor 112 receives the ads to be displayed from the ad server 108, as well as the page in which those ads are to be displayed from the web server 106. Using additional historical data (e.g., the features 308 from FIG. 4), the predictor 112 estimates a click probability or CTR for a particular advertisement on a particular page. That estimated CTR can then be used for determining which ads to display and where to display those ads. In a sponsored search system, the estimated CTR may be multiplied by a bid amount associated with the query to rank the advertisements. In other words, the advertiser bids on keywords/queries, such that the advertiser's selected ad is shown when that keyword/query is searched for and the bid is high enough. In one embodiment, the ads are ranked so that the top ranked ad has the best ad position. As described, that bid amount may be multiplied by the estimated CTR before performing the ranking. This calculation may maximize revenue because the ads are ranked according to their expected revenue. For example, it may be the case that the highest bid may be associated with an ad that has a very low CTR and is consequently not profitable. Calculation of the click probability improves the relevance of the ad ranking. FIGS. 3 and 5 further illustrate the predictor 112 or an alternative embodiment of a predictor 300. The prediction is further described with respect to FIGS. 3 and 5-6.

The predictor 112 may be a computing device for predicting or calculating a click probability for a particular advertisement. The predictor 112 may include a processor 120, a memory 118, software 116 and an interface 114. The predictor 112 may be a separate component from the web server 106 and/or the ad server 108, or they may be combined as a single component or hardware device. Alternatively, as shown in FIG. 2, the predictor 112 may be combined with a separate web server.

The interface 114 may communicate with any of the user device 102, the web server 106, and/or the ad server 108. The interface 114 may include a user interface configured to allow a user and/or an administrator to interact with any of the components of the predictor 112. For example, the administrator and/or user may be able to review or update the features or other data that are used to calculate a click probability.

The processor 120 in the predictor 112 may include a central processing unit (CPU), a graphics processing unit (GPU), a digital signal processor (DSP) or other type of processing device. The processor 120 may be a component in any one of a variety of systems. For example, the processor 120 may be part of a standard personal computer or a workstation. The processor 120 may be one or more general processors, digital signal processors, application specific integrated circuits, field programmable gate arrays, servers, networks, digital circuits, analog circuits, combinations thereof, or other now known or later developed devices for analyzing and processing data. The processor 120 may operate in conjunction with a software program, such as code generated manually (i.e., programmed).

The processor 120 may be coupled with the memory 118, or the memory 118 may be a separate component. The software 116 may be stored in the memory 118. The memory 118 may include, but is not limited to, computer readable storage media such as various types of volatile and non-volatile storage media, including random access memory, read-only memory, programmable read-only memory, electrically programmable read-only memory, electrically erasable read-only memory, flash memory, magnetic tape or disk, optical media and the like. The memory 118 may include a random access memory for the processor 120. Alternatively, the memory 118 may be separate from the processor 120, such as a cache memory of a processor, the system memory, or other memory. The memory 118 may be an external storage device or database for storing recorded ad or user data. Examples include a hard drive, compact disc ("CD"), digital video disc ("DVD"), memory card, memory stick, floppy disc, universal serial bus ("USB") memory device, or any other device operative to store ad or user data. The memory 118 is operable to store instructions executable by the processor 120.

The functions, acts or tasks illustrated in the figures or described herein may be performed by the programmed processor executing the instructions stored in the memory 118. The functions, acts or tasks are independent of the particular type of instruction set, storage media, processor or processing strategy and may be performed by software, hardware, integrated circuits, firm-ware, micro-code and the like, operating alone or in combination. Likewise, processing strategies may include multiprocessing, multitasking, parallel processing and the like. The processor 120 is configured to execute the software 116.

The interface 114 may be a user input device or a display. The interface 114 may include a keyboard, keypad or a cursor control device, such as a mouse, or a joystick, touch screen display, remote control or any other device operative to allow a user or administrator to interact with the predictor 112. The interface 114 may include a display coupled with the processor 120 and configured to display an output from the processor 120. The display may be a liquid crystal display (LCD), an organic light emitting diode (OLED), a flat panel display, a solid state display, a cathode ray tube (CRT), a projector, a printer or other now known or later developed display device for outputting determined information. The display may act as an interface for the user to see the functioning of the processor 120, or as an interface with the software 116 for providing input parameters. In particular, the interface 114 may allow a user to interact with the predictor 112 to view or modify the features or other data for calculating a click probability.

The present disclosure contemplates a computer-readable medium that includes instructions or receives and executes instructions responsive to a propagated signal, so that a device connected to a network can communicate voice, video, audio, images or any other data over a network. The interface 114 may be used to provide the instructions over the network via a communication port. The communication port may be created in software or may be a physical connection in hardware. The communication port may be configured to connect with a network, external media, display, or any other components in system 100, or combinations thereof. The connection with the network may be a physical connection, such as a wired Ethernet connection or may be established wirelessly as discussed below. Likewise, the connections with other components of the system 100 may be physical connections or may be established wirelessly.

Any of the components in the system 100 may be coupled with one another through a network, including but not limited to the network 104. For example, the predictor 112 may be coupled with the web server 106 and/or the ad server 108 through a network. Accordingly, any of the components in the system 100 may include communication ports configured to connect with a network. The network or networks that may connect any of the components in the system 100 to enable communication of data between the devices may include wired networks, wireless networks, or combinations thereof. The wireless network may be a cellular telephone network, a network operating according to a standardized protocol such as IEEE 802.11, 802.16, 802.20, published by the Institute of Electrical and Electronics Engineers, Inc., or WiMax network. Further, the network(s) may be a public network, such as the Internet, a private network, such as an intranet, or combinations thereof, and may utilize a variety of networking protocols now available or later developed including, but not limited to TCP/IP based networking protocols. The network(s) may include one or more of a local area network (LAN), a wide area network (WAN), a direct connection such as through a Universal Serial Bus (USB) port, and the like, and may include the set of interconnected networks that make up the Internet. The network(s) may include any communication method or employ any form of machine-readable media for communicating information from one device to another. As discussed, the ad server 108 or the web server 106 may provide advertisements and/or content to the user device 102 over a network, such as the network 104.

FIG. 2 is a diagram of an alternative exemplary network system 200. In system 200, the web server 210 may include the predictor. A search engine 206 and the ad server 108 are coupled with the web server 210. A search log database 212 is coupled with the search engine 206 and an ad database 214 is coupled with the ad server 108. In alternative embodiments, the predictor may be separate from, but coupled with, the web server 210. The system 200 illustrates that data is sent from the user device 102 over the network 104 to the predictor. The predictor may receive the messages/data that the search engine 206 and the ad server 108 transmit to the user device 102.

The predictor may receive information from the search log database 212 and the ad database 214. That information may be used for calculating a click probability. In one embodiment, the search log database 212 may store historical search queries and the ad database 214 may store data on the selection of and interaction with displayed ads. The ad database 214 may store past CTR data for each ad in the database that is further specific to certain queries, advertisers, or ad campaigns. The bids from advertisers for each search query and for particular advertisements may be stored in the search log database 212 and/or the ad database 214. As described below, the features 308 from FIGS. 3-4 may include data that is stored in the ad database 214 and/or the search log database 212.

The system 200 may include a search query being received from the user device 102 over the network 104 at the web server 210. The search engine 206 provides search results for the received query. The ad server 108 provides advertisements to be displayed with the search results. Based on the search query, search results, and provided advertisements, the predictor estimates the click probability for each advertisement. That click probability may be used in selecting which advertisements to display and where to display those advertisements.

FIG. 3 is an exemplary prediction diagram. The predictor 300 may be the same as the predictor 112 in FIG. 1 or the predictor 210 in FIG. 2. An ad 302 and a query 304 are provided to the predictor 300. In addition, features 308 may also be provided to the predictor 300. The features 308 may include known and unknown features and are further discussed with respect to FIG. 4. The features 308 include relevant data or information that may be used to predict a click probability for an ad. The predictor 300 processes and analyzes the features 308 for both the ad 302 and the query 304 to calculate a click probability 306. The click probability 306 is the probability that a user will click on the ad 302 when it is shown with results from the query 304. In other words, the combination of the ad 302 with the query 304 results in the click probability 306. For different queries, the click probability 306 may be different for the ad 302. The calculation of the click probability 306 is further described with respect to FIGS. 5-6.

FIG. 4 is a diagram of exemplary features 308 for prediction. The predictor may have certain features or data available for calculating a click probability. For each advertisement and/or query, there may be features that are unknown and may need to be estimated for accurately determining the click probability. In one example, a new ad that has never been shown would not have any past CTR information and would have several missing features. The click-prediction features 308 may be derived using any information available in the context of the search, including the query, ad, user, and location. The click-feedback features may include data extracted from the query logs. Features may be related to the user such as click propensity and demographics, and location for targeting purposes. The features 308 shown in FIG. 4 are merely exemplary, and more or fewer features may be used for predicting a click probability.

A query click-through rate ("CTR") 402 is the historical CTR of ads displayed with search results for a particular query. For example, the search results page displayed for the query 304 may display any number of ads and the measured CTR for those ads is the query CTR 402. The query CTR 402 may indicate that certain queries (and their respective search results) may result in ads that are more likely to be clicked. A rewrite CTR 404 is the query CTR for a rewritten query. For example, if the query is "automobiles," the query rewrite may be "cars." If the query is automobiles, the query CTR 402 is the CTR of ads displayed when search results for that query are shown, and the rewrite CTR 404 is the CTR of ads displayed when the search results for "cars" are shown.

A query matching component 406 may be another feature that is relevant to click probability. Advertisers bid on search keywords and the winning bids for advertisements are shown with search results when a user enters the search keyword in a search engine. In some instances, the bidding on a search keyword may also cover similar keywords or queries, such as the rewrites discussed above. The degree of matching with the entered query and the query that was bidded on may be a relevant feature for determining click probability. When the query matches the bidded query closely the click probability may be higher.

The CTR for the advertiser, ad, ad campaign, or ad group may be relevant features. The advertiser CTR 408 refers to the past CTR for all ads from a particular advertiser. The ad CTR 410 refers to the past CTR for a particular ad. The ad campaign CTR 412 refers to the past CTR for all ads within a particular ad campaign. The ad group CTR 414 refers to the past CTR for all ads within a particular ad group. The ad CTR 410 may not be known for a new ad, but utilizing the known CTR for the advertiser 408, or the CTR for the ad campaign 412 may be relevant features for predicting the ad click probability when that new ad is displayed.

A query ad combination CTR 416 may include the CTR for the ad only when it is displayed with search results for a particular query. The query ad combination CTR 416 is a subset of the query CTR 402 and the ad CTR 410 but it only refers to the ad CTR when the ad is displayed in response to the query. The query ad combination CTR 416 may be highly relevant for determining the click probability for the ad, but it may frequently be a missing feature because the ad may never have been displayed for that particular query before.

Other features include the context 418, query type 420, ad matching 422, and page 424. The context features 418 may refer to other external factors. Exemplary context features 418 may include the temporal features, such as the time of the day, day of the week, or month. An estimated CTR may be different during the day when users are at work than at night when users are home. Other context features 418 are related to the geographical location of the user such as the CTR of all users from that location. The query type feature 420 may include whether a query is a URL or is navigational. The ad matching feature 422 may include the degree of the matching, such as whether it is exact. Text features such as string overlap, cosine distance and language-modeling scores may provide semantic and syntactic clues about how closely an ad is related to the query. In one embodiment, the matching may be based on cosine-distance scores. The page feature 424 may include a position on the page.

Other features 308 that may be considered by the predictor 300 including additional information related to the query. For example, the query category, query length, query-ad word overlap, and query subject may be relevant features. Other features 308 include the micromarket of the query (e.g., financial vs. electronics etc.), and syntactic/semantic relevance features extracted from the query and advertiser texts. These other features might include the cosine distance and word overlap between the query, ad title, abstract, and URL. Other features include whether the ad title or description is templated, i.e., whether there are slots in the title or description which can be filled in by the query on the fly.

FIG. 5 is an exemplary predictor 300. The predictor 300 may include an estimation model 502, an indicator flag model 503, an imputed values model 504, a posterior variance model 506, and a feature interaction model 508. The predictor 300 may utilize a combination of generative and discriminative models for predicting click probability as further described below. In one embodiment, the estimation model 502 is a generative model and the indicator flag model 503, the imputed values model 504, the posterior variance model 506, and the feature interaction model 508 are each maximum-entropy models of increasing complexity. In cases with missing data, the generative model infers a posterior distribution over the missing values, and imputes them. Any one of the maximum-entropy models may be used alone, or they may be used together in any combination. The imputed values are utilized in a maximum-entropy model. The indicator flag model 503, the imputed values model 504, the posterior variance model 506, and the feature interaction model 508 may be a series of increasingly complex models that use the information provided by the generative model about the missing features for click prediction. The latent structure discovered by the generative model may be used to derive certain features, which would be unavailable otherwise.

The predictor 300 estimates missing data that is initially inferred or imputed by the estimation model 502. The estimation model 502 may also be referred to as an estimator. The estimation model 502 may include a generative model for dealing with missing data (e.g. features 308), and discovering a latent structure in data to aid click prediction. Given a vector of features x, a representation of x may be generated using a mixture model. Mixture models are classes of distribution models, in which complex multi-modal data is characterized using a convex sum of simpler distributions. A discrete index, referred to as class index, may guide each observation to its data distribution. Mixture models are essentially semi-parametric models and increasingly complex models may be fit using more and more components. This is particularly relevant for sponsored search, where the click-feedback features exhibit wide variability due to the wide range of queries, ads, and users. As described, the generative model may be mixture of Gaussians model, but different generative models may be used (for example, when the missing data is discrete-valued).

In one embodiment, a mixture of Gaussians model may be used to characterize the features:

$$p(x) \equiv \sum_{i=1}^{M} \alpha_i N\left(x; \mu_i, \sum_i\right) \quad (1)$$

In Equation (1), M denotes the number of mixture components, $\alpha_i$ the i-th component weight, and $N(x; \mu_i, \Sigma_i)$ the i-th Gaussian with mean and covariance matrix $\Sigma_i$:

$$N\left(x; \mu, \sum\right) \equiv \left((2\pi)^d |\sum|\right)^{-\frac{1}{2}} \exp\left\{-\frac{1}{2}(x-\mu)^T \sum\nolimits^{-1}(x-\mu)\right\}.$$

This model may be considered a latent variable model by introducing a variable z such that $p(z=i) \equiv \alpha_i$ and $p(x|z=i) \equiv N(x; \mu_i, \Sigma_i)$. The data is generated by first pick z, and then sampling x from the corresponding conditional distribution. Equation (1) may be the marginal distribution of x according to this model. The class variable z is unobserved.

In sponsored search, the class variable in the mixture may be used to identify interesting patterns or clusters in the data. Certain patterns in data may pertain to certain user behavior (e.g., click propensity), or point to interesting queries (e.g., navigational queries, or product search) or advertisers (e.g., ubiquitous advertisers, and micro-markets) clusters. The application of the mixture of Gaussians model to the missing click-feedback includes both parameter estimation, and probabilistic inference. Parameter estimation may be performed in an unsupervised setting, where the class variables are unobserved. The parameters may be estimated using an expectation-maximization ("EM") algorithm. The EM algorithm may be an iterative method for maximum-likelihood estimation in the presence of missing data. An exemplary EM algorithm is described in A. Dempster, N. Laird, and D. Rubin, *Maximum Likelihood from Incomplete Data via the EM Algorithm*, Journal of the Royal Statistical Society, Series B, 39:1-38, 1977; which is hereby incorporated by reference.

Different discriminative models for click prediction may be used, but as described herein, a maximum-entropy model (also known as logistic regression) is used, because they can handle large, sparse, overlapping feature sets very well. In addition, it has a convenient mathematical form, which makes training and deployment of maximum-entropy models straightforward. The maximum-entropy model may take the following form:

$$p(c=1|x) = \frac{1}{1+\exp(w^T t(x))} \quad (2)$$

where w is the weight vector, and t(x) the vector of sufficient statistics. Given a training data set $\{(c_t,x_t)\}_{t=1}^{N}$ of N examples, we estimate w by maximizing the penalized log-likelihood function:

$$\max_w \sum_{t=1}^{T} \log p(c_t|x_t) - \frac{\lambda}{2} w^T w \quad (3)$$

where $\lambda$ is the inverse prior variance. The prior term may act as a regularizer to avoid overfitting.

The maximum-entropy modeling in the presence of missing features may entail a generative model of the input features to impute any missing features. The estimation model 502 fills in the missing features and those imputed features are then used in the maximum-entropy model. The indicator flag model 503, the imputed values model 504, the posterior variance model 506, and the feature interaction model 508 are each maximum-entropy models of increasing complexity. The maximum-entropy modeling may use a binary input presence indicator vector $\delta$: $\delta_i$ is equal to 1 if $x_i$ is observed, and 0 otherwise. The posterior estimate of the input features is denoted by $\hat{x}$. By definition, if $x_i$ is observed, $\hat{x}_i=x_i$. Using $\delta$, x, and $\hat{x}$, a sequence of ME models may be built with increasing complexity for handling missing features. Ultimately, the ME model may account for multi-way interactions among x, $\hat{x}$, and $\delta$, and take the uncertainty in $\hat{x}$ into account.

One embodiment for handling the missing features is to use x, only if x is observed and to use the product $\delta_i x_i$ as a feature in the indicator flag model 503. The indicator flag model 503 may also be referred to as an indicator. For missing $x_i$, $\delta_i x_i=0$, and thus using $\delta_i x_i$ as the feature equates missing features with a zero value. This model may be improved by using the imputed values model 504. The imputed values model 504 utilizes the imputed values $\hat{x}$ in addition to $\delta_i$ and $\delta_i x_i$. By using both $\delta_i x_i$ and $\hat{x}_i$ as features, the observed and imputed values are differentiated. The imputed values model 504 provides different parameter weights depending on whether a dimension is missing, or observed. The imputed values model 504 may also be referred to as a weightor because the values may be weighted.

A more complex model is used by the posterior variance model 506. The posterior variance model 506 may be referred to as a variance modeler. The imputed values model 504 does not use information about the missing information, but the posterior variance model 506 utilizes additional information about the missing features to improve the weighting values. For example, a missing value with a relatively low variance may be predicted accurately by the observed values. Conversely, if the amount of missing information is high, the model should not rely as heavily on the imputed values. The posterior variance model 506 model utilizes a posterior variance, $\sigma_{x_i}^2$, as a feature. The posterior variance may be calculated as: $\sigma_{x_i}^2 \equiv E[x_i^2|y] - E[x_i|y]^2$, where E[A|B] denotes a conditional expectation of a random variable A conditional on another random variable B. The variables A and B can be functions of other random variables in general. That expectation may be calculated according to the model in Equation (1). For observed dimensions of x, the posterior variance is equal to zero.

The feature interaction model 508 utilizes a model with multi-way interaction among the input features. Each feature may contribute independently to the maximum-entropy function. The inter-feature dependencies may provide useful information for predicting clicks. For example, a comparison of the query-ad level CTR to the query-level CTR may reveal the relative quality of an ad among the ads competing for that particular query. To capture such dependencies, bi-linear interaction terms may be used. Since the data or features may be missing both the observed interactions, $\delta_i \delta_j x_i x_j$, as well as estimated interactions, $E[x_i x_j|y]$ may be utilized (which may be calculated according to model in Equation (1)). These variables are included as features in Equation (2), by appending them to the sufficient statistics vector t(x). The feature interaction model 508 may be referred to as an interactor.

The indicator flag modeler 503, the imputed values model 504, the posterior variance model 506, and the feature interaction model 508 utilize ME models that may form a hierarchy where each model may subsume the previous one. In some embodiments, multiple transformations of $x_i$ may be included since the relationship between the features and click may be non-linear. Each of the models may be extended by including the analogous terms for the transformations.

Figure 6:
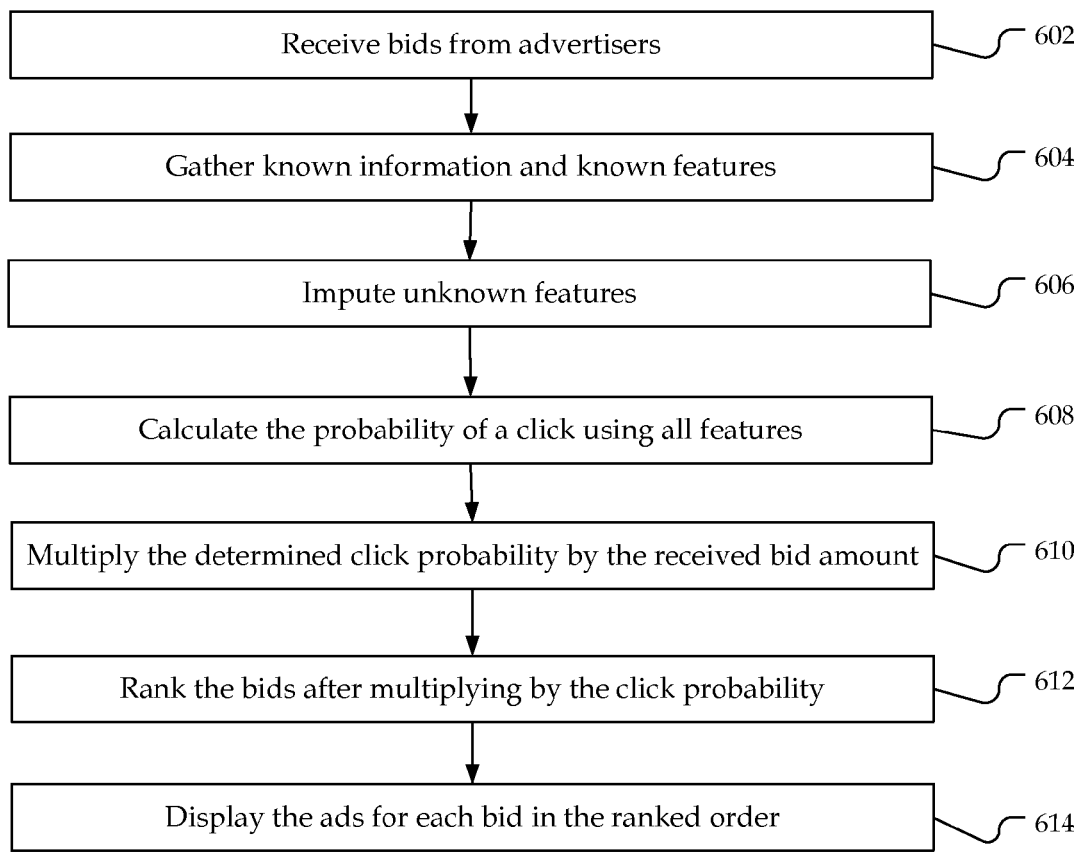
FIG. 6 is a flowchart for the ranking and displaying of advertisements.

FIG. 6 is a flowchart for the ranking and displaying of advertisements. In block 602, advertisers provide bids for their ads to be displayed. The bids may be based on a price per click or a price per action (e.g. a purchase). For example, an advertiser may be 10 cents for every click on their advertisement. The page owner receives all the bids from different advertisers. As described, the page owner is a search engine and the page with the ads is a search result page with sponsored searching. In block 604, information is gathered for each of the advertisers and advertisements. The information in block 604 may be any of the features 308 that are known. This information may be used for estimating a click probability for the advertisement. All of the features 308 may not be known, so the unknown features are imputed in block 606. The predictor 300 and in particular, the estimation model 502, estimates/imputes the unknown features. A generative model may be used for the estimation of the unknown features in block 606. The predictor 300 may then use the known features and imputed features to determine the probability of a click for each advertisement in block 608. The click probability may be determined by any or all of the indicator flag modeler 503, the imputed values model 504, the posterior variance model 506, and/or the feature interaction model 508. The click probability may be for each available advertisement position. For example, in sponsored search, there may be click probability for each ranked position for each advertisement. Alternatively, the click probability may be a general probability for any position or for the top position.

The ranking of the advertisements in block 612 is based on multiplying the determined click probability by the bid amount in block 610. The ranking considers both the bid amount and the click probability, so even if an advertiser has the highest bid amount, if the predicted click probability for the advertisement is low, that advertisement may be ranked lower. The ad ranking in block 612 may determine the order in which the ads are shown in block 614. When a page has multiple ad slots available for display, those slots are filled based on the ranked order of the ads.

The system and process described may be encoded in a signal bearing medium, a computer readable medium such as a memory, programmed within a device such as one or more integrated circuits, and one or more processors or processed by a controller or a computer. If the methods are performed by software, the software may reside in a memory resident to or interfaced to a storage device, synchronizer, a communication interface, or non-volatile or volatile memory in communication with a transmitter. A circuit or electronic device designed to send data to another location. The memory may include an ordered listing of executable instructions for implementing logical functions. A logical function or any system element described may be implemented through optic circuitry, digital circuitry, through source code, through analog circuitry, through an analog source such as an analog electrical, audio, or video signal or a combination. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable medium," "machine readable medium," "propagated-signal" medium, and/or "signal-bearing medium" may comprise any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM", a Read-Only Memory "ROM", an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

We claim:

1. A method for predicting click probability in sponsored search results comprising:
   receiving a search query;
   identifying advertisements for display in response to the search query, wherein each of the advertisements is associated with a bid amount;
   predicting a click probability for each of the identified advertisements, wherein the click probability predicting comprises:
      identifying a set of features to consider for the click probability prediction, wherein each of the features includes either a known or unknown value;
      imputing an estimate for any of the unknown features;
      weighting both the known and unknown features; and
      modeling the weighted features using a variance of the unknown features and dependencies between features;
   ranking the identified advertisements by multiplying the bid amount by the click probability for each of the advertisements; and
   providing a search results page in response to the search query, wherein at least a portion of the ranked advertisements are displayed, further where the displayed advertisements are displayed in an order based on the ranking.

2. The method of claim 1 wherein the imputing comprises a generative model and the modeling comprises using a maximum entropy model.

3. The method of claim 1 wherein the predicting further comprises:
   indicating which of the features include a known value and which of the features include an unknown value.

4. The method of claim 1 wherein the variance comprises a posterior variance, wherein the posterior variance is zero for known features.

5. The method of claim 1 wherein the dependencies are determined using bi-linear interaction terms as inputs with observed interactions and estimated interactions.

6. The method of claim 1 wherein the advertisements are identified when the bid amount corresponds to a bid for the search query or for a rewrite of the search query.

7. The method of claim 6 wherein the rewrite of the search query comprises alternate forms of the search query.

8. The method of claim 6 wherein each of the advertisements include a bid for at least one search query.

9. The method of claim 6 further comprising determining each of the bids for the search query.

10. The method of claim 9 wherein the identifying comprises identifying each of the advertisements that are subject to the bids for the search query.

11. A computer system for predicting click probability comprising:
   a search engine processor configured to receive a search query and provide search results in response to the search query;
   an advertisement server coupled with the search engine and configured to provide at least one advertisement with the search results; and
   a predictor coupled with the search engine and configured to provide a click probability for the at least one advertisement provided with the search results, the predictor comprising:

an estimator that imputes an estimate for any of the unknown features;

a weightor that provides weights for both the known and unknown features;

a variance modeler that models the weighted features using a variance of the unknown features; and an interactor that determines dependencies between features;

wherein the click probability is predicted using the weights, variance, and dependencies for the known and unknown features.

12. The computer system of claim 11 further comprising a search log database that stores search query information from the search engine, wherein the known and unknown features include the stored search query information.

13. The computer system of claim 11 further comprising an ad database that stores advertisement information from the ad server, wherein the known and unknown features include the stored advertisement information.

14. The computer system of claim 11 wherein the click probability is predicted using a maximum entropy model with the weights, variance, and dependencies.

15. The computer system of claim 11 wherein the variance comprises a posterior variance, wherein the posterior variance is zero for known features.

16. The computer system of claim 11 wherein the dependencies are determined using bi-linear interaction terms as inputs with observed interactions and estimated interactions.

17. The computer system of claim 11 wherein each advertisement provided by the advertisement server is associated with a bid amount that corresponds to a bid for the search query or for a rewrite of the search query.

18. The computer system of claim 17 wherein the rewrite of the search query comprises alternate forms of the search query.

19. The computer system of claim 17 wherein the search engine processor ranks each of the at least one advertisements received from the advertisement server, wherein the ranking is based each advertisement's bid amount multiplied by the predicted click probability for that advertisement.

20. The computer system of claim 19 wherein the provided search results include advertisements based on the ranking.

21. In a computer readable medium having stored therein data representing instructions executable by a programmed processor for predicting click probability, the storage medium comprising instructions operative for:

identifying advertisements for display in a page;

predicting a click probability for each of the identified advertisements, wherein the click probability prediction comprises:

identifying known features and unknown features to consider for the click probability prediction, wherein the known and unknown features comprise a past click-through rate ("CTR");

imputing an estimate for any of the unknown features;

calculating the click probability based on the known features and the imputed estimates for the unknown features, wherein the calculation includes modeling dependencies between the features;

ranking the identified advertisements based on the click probability for each of the advertisements; and providing at least a portion of the identified advertisements for display in an order based on the ranking.

22. The computer readable medium of claim 21 wherein the page comprises a search results page displayed in response to receiving a search query.

23. The computer readable medium of claim 22 wherein the past CTR comprises a CTR for the identified advertisement, an advertiser, an advertisement campaign, the search query, a rewrite of the search query, or a combination of the identified advertisement with the search query.

24. The computer readable medium of claim 21 wherein the calculation further comprises weighting each of the features and using a variance of the unknown features before modeling the dependencies.

* * * * *